United States Patent
Johnsen et al.

(10) Patent No.: US 9,559,894 B2
(45) Date of Patent: Jan. 31, 2017

(54) SYSTEM AND METHOD FOR SUPPORTING HIGH AVAILABLE (HA) NETWORK COMMUNICATION IN A MIDDLEWARE MACHINE ENVIRONMENT

(71) Applicant: Oracle International Corporation, Redwood Shores, CA (US)

(72) Inventors: Bjørn Dag Johnsen, Olso (NO); Prabhunandan B. Narasimhamurthy, Bangalore (IN); Predrag Hodoba, Heggedal (NO); Dag Georg Moxnes, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/972,678

(22) Filed: Aug. 21, 2013

(65) Prior Publication Data
US 2014/0056121 A1 Feb. 27, 2014

Related U.S. Application Data

(60) Provisional application No. 61/692,144, filed on Aug. 22, 2012.

(51) Int. Cl.
| | |
|---|---|
| *H04L 12/26* | (2006.01) |
| *H04L 12/24* | (2006.01) |
| *H04L 29/14* | (2006.01) |
| *H04L 29/08* | (2006.01) |
| *H04L 29/12* | (2006.01) |

(52) U.S. Cl.
CPC ........... *H04L 41/0654* (2013.01); *H04L 69/32* (2013.01); *H04L 69/40* (2013.01); *H04L 61/2007* (2013.01)

(58) Field of Classification Search
USPC ........ 370/218, 219, 220, 216, 252; 709/222, 709/227
See application file for complete search history.

(56) References Cited

U.S. PATENT DOCUMENTS

| | | | |
|---|---|---|---|
| 6,014,669 | A | 1/2000 | Slaughter et al. |
| 6,728,780 | B1 | 4/2004 | Hebert |
| 7,451,208 | B1 | 11/2008 | Bakke et al. |
| 2003/0217156 | A1 | 11/2003 | Datta |
| 2004/0017769 | A1 | 1/2004 | Denecheau et al. |
| 2004/0098447 | A1 | 5/2004 | Verbeke et al. |
| 2005/0050227 | A1 | 3/2005 | Michelman |

(Continued)

OTHER PUBLICATIONS

Sonderegger, J. et al., Junos High Availability, Aug. 24, 2009, http://proquest.safaribooksonline.com/book/networking/junos/9780596805449/junos-ha-concepts/control_plane_high_availability#X2ludGVybmFsX0h0bWxWaWV3P3htpGlkPTk30DA1OTY4MDU0NDklMkZncmFjZWZ1Bf9yb3VaW5nX2VuZ2luZV9d2I0Y2hvdmlVyX29wZW4cXVlcnk9 (retrieved on Nov. 13, 2013), pp. 1-5.

Shaikh, A. et al., An OSPF Topology Server Design and Evaluation, IEEE Journal on Selected Area in Communications, IEEE Service Center, Piscataway, US, vol. 20, No. 4, May 1, 2002, pp. 746-755.

(Continued)

*Primary Examiner* — Zewdu A Beyen

(74) *Attorney, Agent, or Firm* — Tucker Ellis LLP

(57) ABSTRACT

A system and method can implement highly available Internet Protocol (IP) based communication across multiple independent communication paths. The system can have different IP addresses associated with different interfaces and communication paths and can implement communication fail-over as part of the communication layers above the IP layer, e.g. at the application level. The system can provide a balance between an average fail-over time and implementation complexity, and can achieve simplicity and robustness while providing high communication performance.

20 Claims, 7 Drawing Sheets

(56) References Cited

U.S. PATENT DOCUMENTS

| | | | |
|---|---|---|---|
| 2005/0105476 A1 | 5/2005 | Gotesdyner | |
| 2006/0268682 A1 | 11/2006 | Vasseur | |
| 2007/0157303 A1 | 7/2007 | Pankratov | |
| 2007/0237141 A1* | 10/2007 | Marchese | H04L 41/0853 370/389 |
| 2007/0268913 A1* | 11/2007 | Denecheau et al. | 370/397 |
| 2008/0025226 A1* | 1/2008 | Mogul et al. | 370/242 |
| 2009/0147698 A1* | 6/2009 | Potvin | H04L 45/02 370/254 |
| 2009/0307522 A1 | 12/2009 | Olson et al. | |
| 2010/0094954 A1 | 4/2010 | Han et al. | |
| 2011/0010434 A1 | 1/2011 | Eleftheriou | |
| 2011/0106921 A1 | 5/2011 | Brown | |
| 2012/0233299 A1 | 9/2012 | Attanasio | |
| 2012/0278455 A1 | 11/2012 | Peng et al. | |
| 2013/0246606 A1 | 9/2013 | Branch et al. | |
| 2015/0074779 A1 | 3/2015 | Gu | |

OTHER PUBLICATIONS

Jacobson, V. et al , Custodian-Based Information Sharing, IEEE Communications Magazine, IEEE Service Center, Piscataway, US, vol. 50, No. 7, Jul. 1, 2012, pp. 38-43.
International Search Report dated Nov. 20, 2013, International Application No. PCT/US2013/056261 filed Aug. 22, 2013, 4 pages.
International Search Report dated Dec. 4, 2013, International Application No. PCT/US2013/056258 filed Aug. 22, 2013, 4 pages.
International Search Report and Written Opinion dated Dec. 4, 2013, International Application No. PCT/US2013/056258, 11 pages.
International Search Report and Written Opinion dated Nov. 20, 2013, International Application No. PCT/US2013/056261, 10 pages.
United States Patent and Trademark Office, Notice of Allowance and Fee(s) Due Dated Feb. 1, 2016 for U.S. Appl. No. 13/972,698, 22 pages.

* cited by examiner

SYSTEM AND METHOD FOR SUPPORTING HIGH AVAILABLE (HA) NETWORK COMMUNICATION IN A MIDDLEWARE MACHINE ENVIRONMENT

CLAIM OF PRIORITY

This application claims priority on U.S. Provisional Patent Application No. 61/692,144, entitled "SYSTEM AND METHOD FOR SUPPORTING HIGH AVAILABLE (HA) NETWORK COMMUNICATION IN A MIDDLEWARE MACHINE ENVIRONMENT" filed Aug. 22, 2012, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a middleware machine environment.

BACKGROUND

The interconnection network plays a beneficial role in the next generation of super computers, clusters, and data centers. For example, the InfiniBand (IB) technology has seen increased deployment as the foundation for a cloud computing fabric. As larger cloud computing architectures are introduced, the performance and administrative bottlenecks associated with the traditional network and storage have become a significant problem.

This is the general area that embodiments of the invention are intended to address.

SUMMARY

Described herein is a system and method that can implement highly available Internet Protocol (IP) based communication across multiple independent communication paths. The system can have different IP addresses associated with different interfaces and communication paths and can implement communication fail-over as part of the communication layers above the IP layer, e.g. at the application level. Furthermore, the system can provide a reasonable balance between an average fail-over time and implementation complexity, and can achieve simplicity and robustness while providing high communication performance.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Internet Protocol (IP) network as an example for a computer network. It will be apparent to those skilled in the art that other types of computer networks can be used without limitation.

Described herein is a system and method that can support highly available communication in a middleware machine environment. For example, the system can use short timeout "ping" type operation for probing destination Internet Protocol (IP) addresses in order to guard synchronous Transmission Control Protocol (TCP) based Remote Procedure Call (RPC) operations in a middleware machine environment.

Highly Available (HA) IP Based Communication

In accordance with an embodiment of the invention, different techniques can be used to implement highly available communication, such as IP based communication across multiple independent communication paths in a middleware machine environment.

Figure 1:
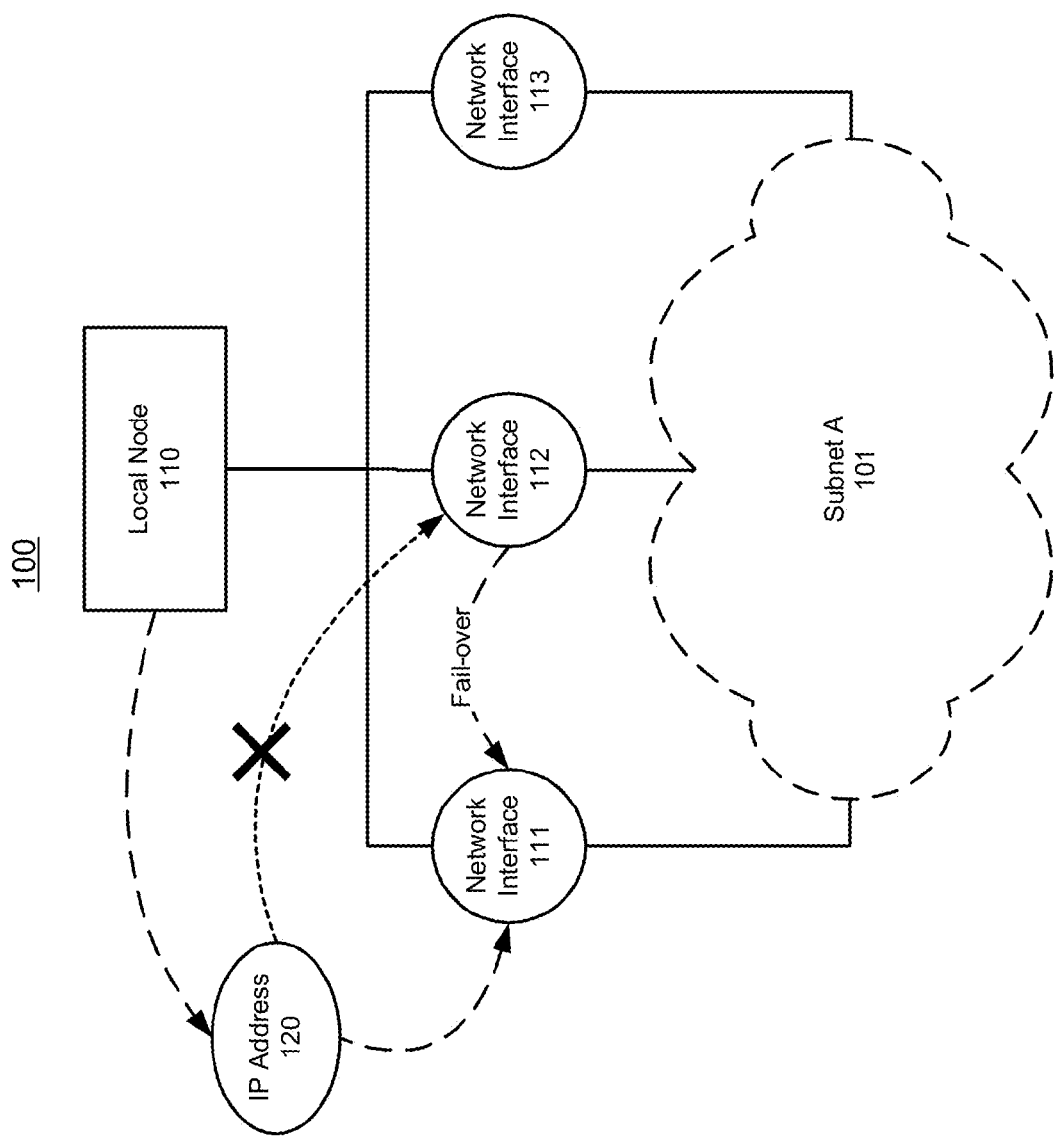
FIG. 1 shows an illustration of supporting highly available IP based communication via dynamically binding an IP address to various network interfaces in a middleware machine environment, in accordance with an embodiment of the invention.

FIG. 1 shows an illustration of supporting highly available IP based communication via dynamically binding an IP address to various network interfaces in a middleware machine environment, in accordance with an embodiment of the invention. As shown in FIG. 1, a local node 110 can be connected to a subnet 101 in a middleware machine environment 100 via one or more network interfaces, e.g. layer two network interfaces 111-113.

Furthermore, the system can dynamically bind a relevant IP address 120 to the different network interfaces 111-113 that represent redundant paths to the local node 110. Additionally, the system can support detecting a need for fail-over in a middleware machine environment, e.g. via detecting that a local network link failure event has been recorded, or using an asynchronous communication interface as well as a separate timeout mechanism relative to probing one or more pre-defined destination addresses on the local network.

As shown in FIG. 1, once detecting a need for fail-over (e.g. via recording a local network link failure), the system can disassociate the IP address 120 from the network interface 112, and dynamically bind the IP address 120 with another network interface 111.

This approach, which is also used in modern operating systems (e.g. bonding in Linux and IPMP in Solaris), can provide a relatively straight forward way for one OS instance to make use of multiple interfaces 111-113 to the same layer two IP subnet 101, in order to make local IP addresses 120 highly available, as well as make local access to the layer two subnet 101 highly available. One benefit of this approach is that failure-detection and fail-over of the IP address assignment takes place within the timeout and retry boundaries of higher level protocols (e.g. TCP connection timeout values). As long as this is achieved, there can be no impact on application level communication except for potential temporary drop in throughput or delays in message delivery.

On the other hand, this approach depends on each interface having the same type, and also depends on each local interface being connected to the same layer two subnet that implements a single and fully connected broadcast domain (i.e. fail-over actions are local to each host, and each host must be able to define what local interface it will use as active at any point in time).

Thus, a different approach may be needed in systems where it is not possible to fulfill each of the above requirements.

Figure 2:
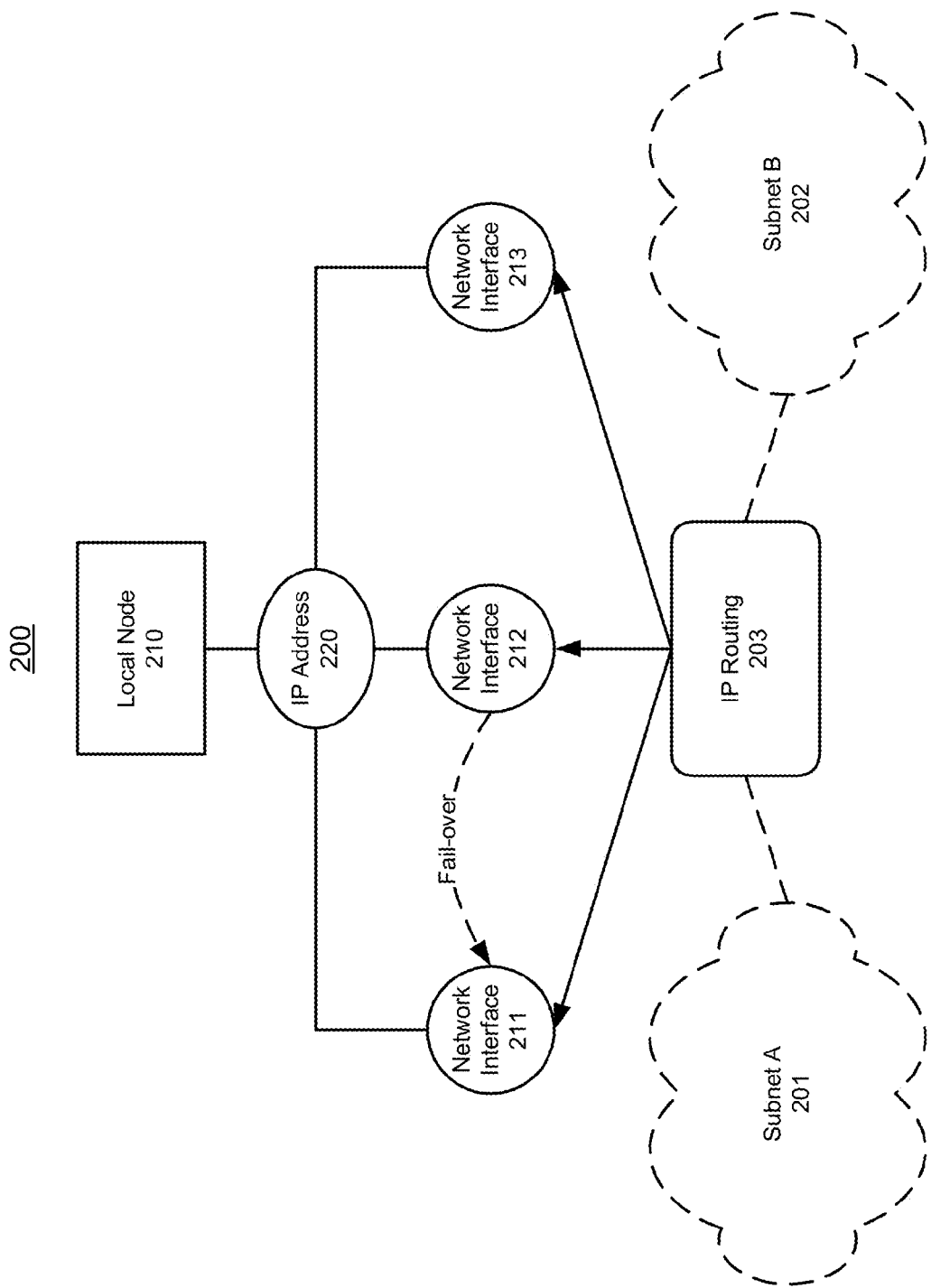
FIG. 2 shows an illustration of supporting highly available IP based communication using IP routing techniques in a middleware machine environment, in accordance with an embodiment of the invention.

FIG. 2 shows an illustration of supporting highly available IP based communication using IP routing techniques in a middleware machine environment, in accordance with an embodiment of the invention. As shown in FIG. 2, a local node 210 can be connected to various subnets 201-202 in a middleware machine environment 200 via different network interfaces, e.g. layer two network interfaces 211-213.

Furthermore, the system can use IP routing 203 techniques in order to allow a single highly available network address, e.g. a service IP address 220, to be available via different paths and interfaces that have different local IP addresses.

As shown in FIG. 2, using IP routing 203, the system can direct traffic to the network interface 211 once detecting a need for fail-over. Unlike the approach as shown in FIG. 1 where IP address 120 is dynamically associated with a different network interface, the system can continue to use the IP address 220, instead of disassociating the IP address 220 from the network interface 212 and dynamically associating the IP address 220 with another network interface 211.

Thus, using IP routing 203, the local failover time may be reduced. Furthermore, this approach is more generic than the approach as shown in FIG. 1, since it can be independent of media types and the external network topologies.

Similar to the approach shown in FIG. 1, a benefit of this approach is that failure-detection and fail-over of the IP address assignment can take place within the timeout and retry boundaries of higher level protocols (e.g. TCP connection timeout values). As long as this is achieved, there is no impact on application level communication except for potential temporary drop in throughput or delays in message delivery.

On the other hand, using IP routing 203 implies a need for the IP routing rules and routing capability advertisements of each host to be synchronized with the routing rules that exists for each involved network. Thus, the maintenance of such schemes can be complex and error prone, if the per host IP routing capability is not an integral part of the overall logical network design in the data center.

Also, the fail-over based on IP routing 203 may not be a required part of a cluster type product design unless the cluster configuration defines a set of private networks. Additionally, the fail-over based on IP routing 203 may not be considered as a valid option in the case of using the data center management networks.

Thus, a different approach may be needed for implementing system specific highly available communication.

Figure 3:
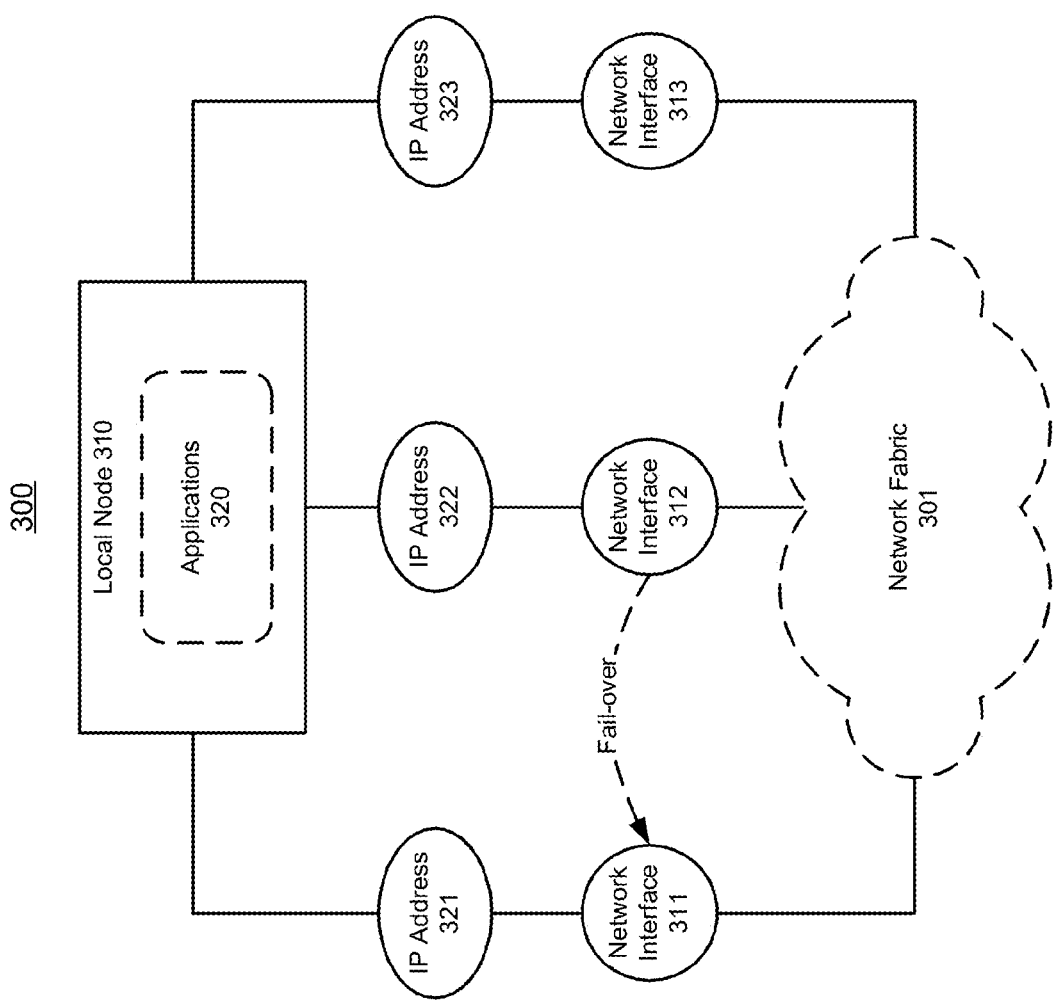
FIG. 3 shows an illustration of supporting highly available IP based communication via communication layers above the IP layer in a middleware machine environment, in accordance with an embodiment of the invention.

FIG. 3 shows an illustration of supporting highly available IP based communication via communication layers above the IP layer in a middleware machine environment, in accordance with an embodiment of the invention. As shown in FIG. 3, a local node 310 can be connected to a network fabric 301 in a middleware machine environment 300 via different network interfaces, e.g. layer two network interfaces 311-313. The network fabric 301 can include various subnets. Furthermore, different IP addresses 321-323 can be associated with different network interfaces 311-313 and communication paths.

Additionally, the system can implement communication fail-over as part of the communication layers above the IP layer (layer three), e.g. at the application level via applications 320 residing on the local node 301.

This approach has a large degree of flexibility and is very versatile. Also, this approach does not depend on the external network design or topologies. On the other hand, this approach adds implementation complexity when implemented at the application level. Additionally, if transport protocols like TCP are used to achieve ordering and reliability, then fail-over operations may need to ensure that they do not violate reliability or ordering achieved via TCP. Thus, there may be a need to either implement a reliable ordering protocol that operates across multiple independent TCP connections, or to limit each operation that can be retried via another connection to be idempotent relative to each other.

Furthermore, when the third approach is used, the system can employ a ping type probing scheme, which can be described in the following section, for detecting a need for fail-over.

Ping Type Probing Scheme

Figure 4:
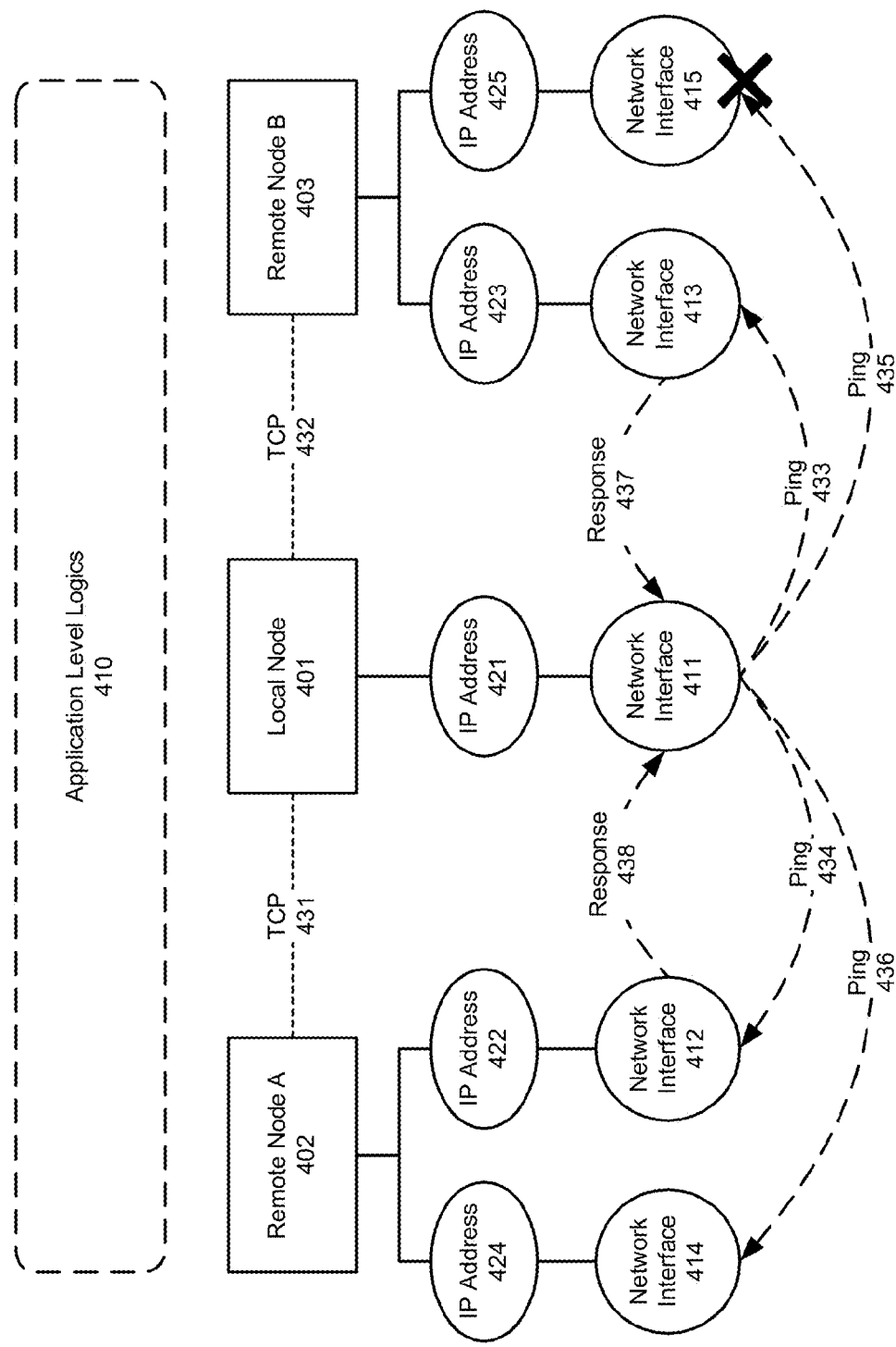
FIG. 4 shows an illustration of implementing communication fail-over using a ping type probing scheme in a middleware machine environment, in accordance with an embodiment of the invention.

FIG. 4 shows an illustration of implementing communication fail-over using a ping type probing scheme in a middleware machine environment, in accordance with an embodiment of the invention. As shown in FIG. 4, a middleware machine environment 400 can include a local node 401 and one or more remote nodes A-B 402-403.

For example, using the approach as shown in FIG. 3, each node can be associated with a set of network interfaces and a corresponding set of network addresses. As shown in FIG. 4, the local node 401 is associated with a network interface 411 and an IP address 421, while the remote node 402 is associated with a set of network interfaces 412 and 414 and IP addresses 422 and 424 and the remote node 403 is associated with a set of network interface 413 and 415 and IP address 423 and 425.

In other examples, without limitation, there can be many different combinations of local network interfaces and remote IP addresses. Also, several remote IP addresses may be associated with the same local network interface and vice versa.

As shown in FIG. 4, the local node 401 can establish a new connection, e.g. a TCP connection 431 or 432, every time when a remote operation (or a sequence of remote operations) is to be performed based on application logics 410. Furthermore, the system can perform all operations synchronously according to the standard TCP timeout settings in order to minimize the risks that are ordering or retry related. Then, the system can close the connection 431 or 432 after the remote operation is completed.

In accordance with an embodiment of the invention, before a new connection is established, the system can use one of the probing operations 433-436, in order to find out the availability of the remote service IP address via the corresponding remote network interface 412-415. For example, each of the probing operations 433-436 can be an Internet Control Message (ICM) based ping operation or other datagram based request/response operations, which can have a short timeout value relative to the TCP level connection timeouts.

As shown in FIG. 4, when a probing operation, e.g. ping 435, fails at the primary interface 415 and target IP address 425, which are associated with the remote node B 403, the system can try another probing operation, e.g. ping 433, on an alternative IP address 423 via the corresponding remote network interface 413. Then, the system can set up the communication between the local node 401 and the remote node B 403, once the network interface 411 receives a response 437 from the network interface 413.

Additionally, in order to reduce the setup time in the presence of communication problems, the system can concurrently perform ping operations for multiple target IP addresses and remote network interfaces that are all associated with a specific remote target node. As shown in FIG. 4, the local node 401 can concurrently perform ping operations 434 and 436 for multiple target IP addresses 422 and 424 and remote network interfaces 412 and 414 that are all associated with a target node A 402. In such a case, the local node 401 can use the combination of the IP address 412 and the network interface 422, from which the system receives the first ping response 438.

Figure 5:
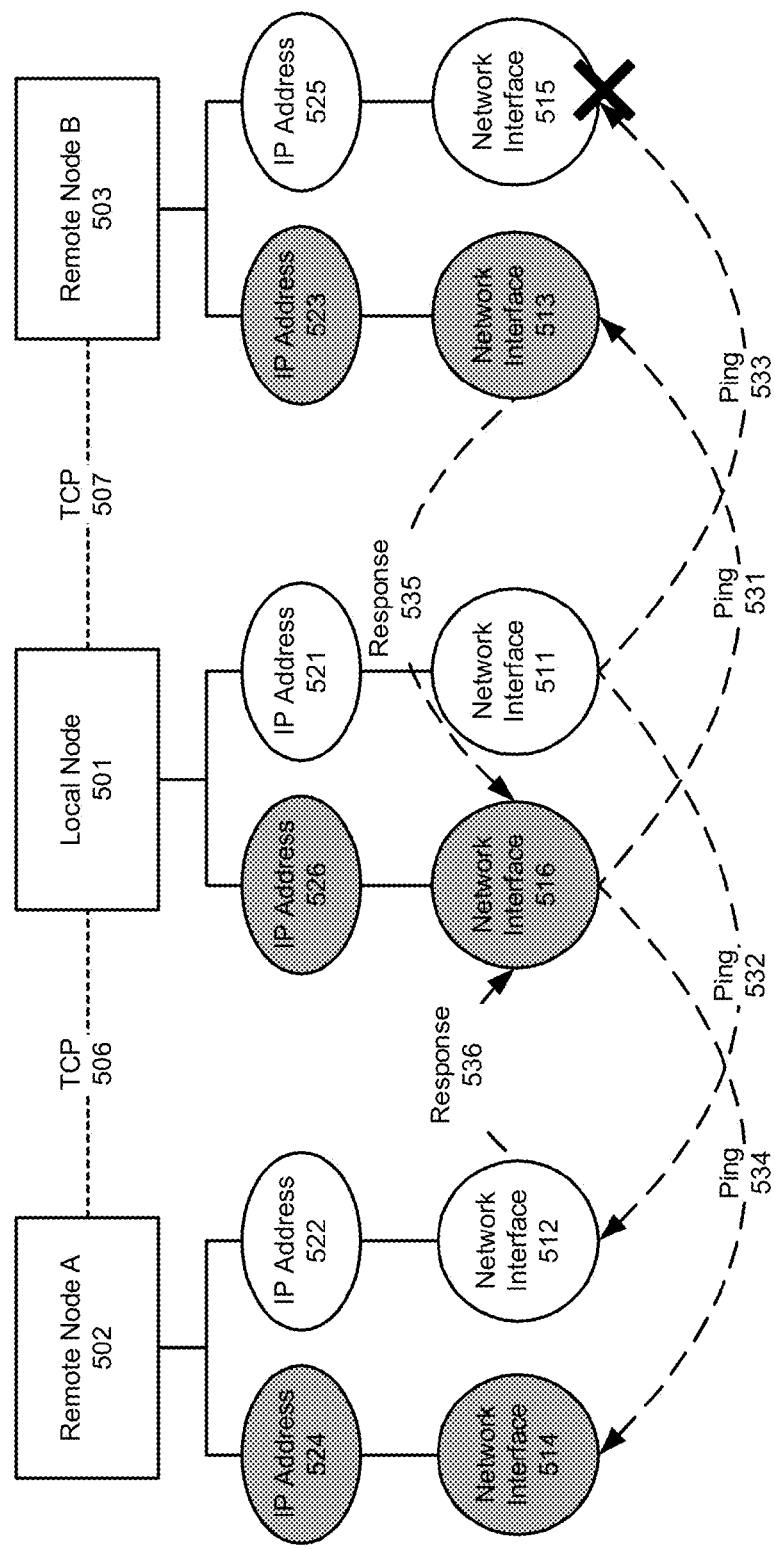
FIG. 5 shows an illustration of using multiple local interfaces to perform probe operations on remote interfaces in networks without inter-connectivity in a middleware machine environment, in accordance with an embodiment of the invention.

FIG. 5 shows an illustration of using multiple local interfaces to perform probe operations on remote interfaces in networks without inter-connectivity in a middleware machine environment, in accordance with an embodiment of the invention. As shown in FIG. 5, a middleware machine environment 500 can include a local node 501 and several remote nodes, e.g. a remote node A 502 and a remote node B 503.

Using the ping type probing scheme, each node can be associated with a set of network interfaces and a corresponding set of network addresses, where each such network interface may represent connectivity to a different physically independent network.

As shown in FIG. 5, the local node 501 is associated with a set of local network interfaces 511 and 516. The local network interface 511 is associated with an IP address 521, while the local network interface 516 is associated with an IP address 526. Furthermore, the remote node A 502 is associated with a set of network interfaces 512 and 514 and IP addresses 522 and 524, and the remote node B 503 is associated with a set of network interface 513 and 515 and IP address 523 and 525.

Additionally, the network interfaces 513, 514, and 516 can be associated with a physical network X (PNX), and the network interfaces 511, 512 and 515 can be associated with a different physical network Y (PNY). Here, each physical network (PNX or PNY) can represent either a physical Ethernet network or an IP-over-IB logical network. For example, this system allows the use of management Ethernet interfaces and an IP-over-IB logical network dedicated for network management. Furthermore, the corresponding IP addresses 521-526 can be associated with different IP subnets. For example, a subnet X (SubX) on PNX can include IP addresses 523-524, and 526 and a subnet Y (SubY) on PNY can include IP addresses 521-522 and 525.

In accordance with an embodiment of the invention, the system can use each of the local network interfaces 511 and 516 to probe different physically independent networks, such as PNX and PNY. In the above example, the local Node 501 may only perform probe operations via interface 516 for IP addresses 523-524 and 526, which belongs to SubX, and may only perform probe operations via interface 511 for IP addresses 521-522 and 525, which belongs to SubY. Thus, any packet sent on a network interface associated with PNX may not arrive on a network interface associated with PNY (i.e. PNX and PNY are independent networks without inter-connectivity).

As shown in FIG. 5, the local Node 501 can use the local network interface 516 to probe the network interface 514 on the remote node A 502 (e.g. using a ping operation 534) and to probe the network interface 513 on the remote node B 503 (e.g. using a ping operation 531). Additionally, the system can use the local network interface 511 to probe the network interface 512 on the remote node A 502 (e.g. using a ping operation 532), and the network interface 515 on the remote node B 503 (e.g. using a ping operation 533).

In other examples, without limitation, there can be many different combinations of local network interfaces and remote IP addresses. Also, several remote IP addresses may be associated with the same local network interface and vice versa.

As shown in FIG. 5, the local node 501 can establish a new connection, e.g. a TCP connection 506 or 507, every time when a remote operation (or a sequence of remote operations) is to be performed based on application logics. Furthermore, the system can perform all operations synchronously according to the standard TCP timeout settings in order to minimize the risks that are ordering or retry related. Then, the system can close the connection 506 or 507 when the remote operation is completed.

In accordance with an embodiment of the invention, before a new connection is established, the system can use one of the probing operations 531-534, in order to find out the availability of the remote service IP address via the corresponding remote network interface 512-515 in the different physical networks. For example, each of the probing operations 531-534 can be an Internet Control Message (ICM) based ping operation or other datagram based request/response operations, which can have a short timeout value relative to the TCP level connection timeouts.

In the example as shown in FIG. 5, when a probing operation, e.g. ping 533, fails at the primary interface 515 and target IP address 525, which are associated with the remote node B 503, the system can try another probing operation, e.g. ping 531 from the local network interface 516, on an alternative IP address 523 via the corresponding remote network interface 513. Then, the system can set up the communication between the local node 501 and the remote node B 503, once the network interface 516 receives a response 535 from the network interface 513.

Additionally, in order to reduce the setup time in the presence of communication problems, the system can concurrently perform ping operations for multiple target IP addresses and remote network interfaces that are all associated with a specific remote target node.

As shown in FIG. 5, using the local network interfaces 511 and 516, the local node 501 can concurrently perform ping operations 532 and 534 for multiple target IP addresses 522 and 524 and remote network interfaces 512 and 514 that are all associated with a target node A 502. In such a case, the local node 501 can use the combination of the IP address 512 and the network interface 522, from which the system receives the first ping response 536.

Figure 6:
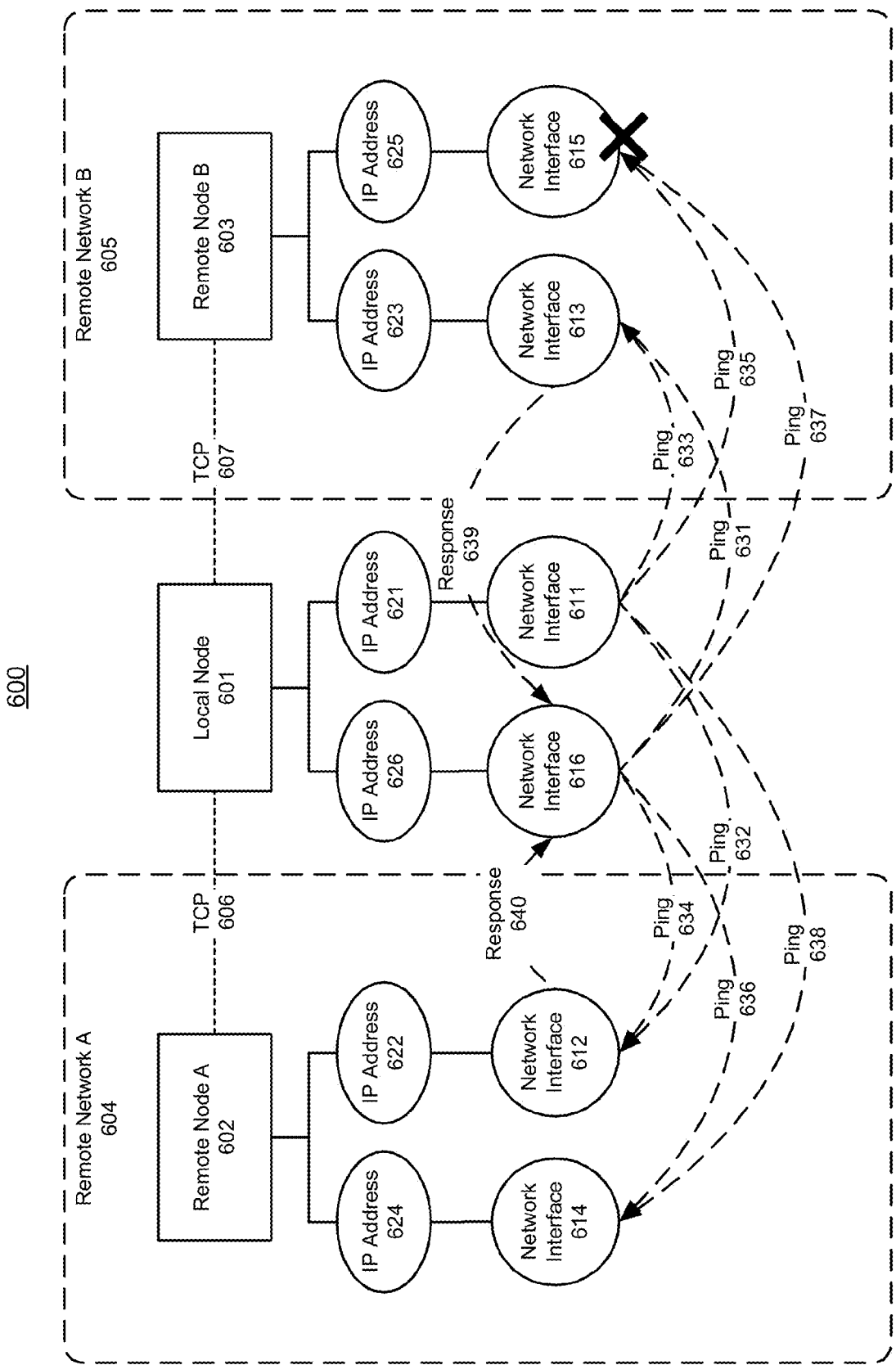
FIG. 6 shows an illustration of using multiple local interfaces to perform probe operations on remote interfaces in networks with inter-connectivity in a middleware machine environment, in accordance with an embodiment of the invention.

FIG. 6 shows an illustration of using multiple local interfaces to perform probe operations on remote interfaces in networks with inter-connectivity in a middleware machine environment, in accordance with an embodiment of the invention. As shown in FIG. 6, a middleware machine environment 600 can include a local node 601 and several remote nodes, e.g. a remote node A 602 in a remote network A 604 and a remote node B 603 in a remote network A 605.

Additionally, using the ping type probing scheme, each node can be associated with a set of network interfaces and a corresponding set of network addresses. As shown in FIG. 6, the local node 601 is associated with a set of local network interfaces 611 and 616. The local network interface 611 is associated with an IP address 621, while the local network interface 616 is associated with an IP address 626. Furthermore, the remote node A 602 is associated with a set of network interfaces 612 and 614 and IP addresses 622 and 624, and the remote node B 603 is associated with a set of network interface 613 and 615 and IP address 623 and 625.

Here, the system can correspond to the concept as illustrated in FIG. 2. Furthermore, the application level logic allows local node 601 to perform probing on the possible permutations of local network interfaces and remote IP addresses, instead of relying on each local node moving a single IP address between local interfaces as a fail-over action.

In accordance with an embodiment of the invention, the system can use each of the local network interfaces 611 and 616 to probe the different physically independent networks A-B 604-605. As shown in FIG. 6, in order to ping both interfaces on either the node A 602 or the node B 603 in the different physically independent networks A-B 604-605, the local node 601 can perform one ping operation from each of the local interfaces 611 and 616 (i.e. ping operations 631-638). Thus, the system can use the local network interface 616 to probe the network interface 614 on the remote node A 602 and the network interface 613 on the remote node B 603. Additionally, the system can use the local network interface 611 to probe the network interface 612 on the remote Node A 602 and the network interface 615 on the remote node B 603 (i.e. all the network interfaces on all the nodes are able to communicate with each others).

In other examples, without limitation, there can be many different combinations of local network interfaces and remote IP addresses. Also, several remote IP addresses may be associated with the same local network interface and vice versa.

As shown in FIG. 6, the local node 601 can establish a new connection, e.g. a TCP connection 606 or 607, every time when a remote operation (or a sequence of remote operations) is to be performed based on application logics. Furthermore, the system can perform all operations synchronously according to the standard TCP timeout settings in order to minimize the risks that are ordering or retry related. Then, the system can close the connection 606 or 607 when the remote operation is completed.

In accordance with an embodiment of the invention, before a new connection is established, the system can use one of the probing operations 631-638, in order to find out the availability of the remote service IP address via the corresponding remote network interface 612-615 in the different physical networks A-B 604-605. For example, each of the probing operations 631-638 can be an Internet Control Message (ICM) based ping operation or other datagram based request/response operations, which can have a short timeout value relative to the TCP level connection timeouts.

In the example as shown in FIG. 6, when a probing operation, e.g. ping 635, fails at the primary interface 615 and target IP address 625, which are associated with the remote node B 603, the system can try another probing operation, e.g. ping 631 from the local network interface 616, on an alternative IP address 623 via the corresponding remote network interface 613. Then, the system can set up the communication between the local node 601 and the remote node B 603, once the network interface 616 receives a response 639 from the network interface 613.

Additionally, in order to reduce the setup time in the presence of communication problems, the system can concurrently perform ping operations for multiple target IP addresses and remote network interfaces that are all associated with a specific remote target node.

As shown in FIG. 6, via the local network interfaces 611 and 616, the local node 601 can concurrently perform ping operations 632, 634, 636, and 638 for multiple target IP addresses 622 and 624 and remote network interfaces 612 and 614 that are all associated with a target node A 602. In such a case, the local node 601 can use the combination of the IP address 622 and the network interface 612, from which the system receives the first ping response 640.

Furthermore, if only idempotent operations are performed in the system, then multiple permanent connections can be maintained by the system. For example, the system can maintain the same set of connections as long as they are deemed operational, instead of establishing new connections for each set of remote operations. In such a case, the only overhead for each set of operations is the "ping" based scheme that is used for selecting the connection to perform the operation.

In accordance with an embodiment of the invention, this ping based scheme can provide a reasonable balance between an average fail-over time and implementation complexity, and can achieve simplicity and robustness relative to achieving the highest possible communication performance (especially when some overhead may be acceptable).

One benefit of the ping based scheme is that the average failure detection time can be significantly reduced relative to the failure detection based on TCP timeout scheme. As a result, the fail-over time can be reduced as a whole. For example, when remote operations are active only for a small part of the overall application run time, the ping based probing operation can catch most hard communication path problems prior to performing the remote operation.

Furthermore, communication failure may occur during a remote operation, in which case the failover time may be subject to the TCP timeout delay. Also, as the communication becomes more frequent, the chance of encountering a communication problem during communication becomes higher, and the average failover time may increase since more failures may be detected via TCP timeout, instead of via the ping based probing.

In accordance with an embodiment of the invention, the ping based scheme for communication failure detection can be beneficial for both the case with fully operational redundant communication and the case when not all redundant paths are operational.

Also, the ping based scheme can be used for implementing the management operations, which are not performed very frequent and where short response time is highly desirable, but not required.

Additionally, this ping based communication failover scheme can be used for very communication intensive applications or for systems that must guarantee response times in the order of a few seconds, and also in the case of failures that brings down one of the redundant paths.

Another benefit of the ping based scheme is that, when used for supporting remote procedure call (RPC) based communication, only the initiator (or client) side of the RPC operation may be aware of the ping based probing schemes and the fail-over handling.

As long as the RPC response is returned immediately after the responder (server) receives the corresponding request, the initial guard ping operation can be relevant (i.e. adjacent in time) for both the request and response part of the RPC operations. Then, the responder (server) side of the RPC operation returns responses via the same path as the request arrived. Also, the responder (server) side can transparently do fail-over operations as a result of the explicit choice of the path by the initiator (or client) side.

In accordance with an embodiment of the invention, a manager type application can act as an RPC client, with a number of different agents operating as RPC servers. The manager type application can implement redundant path based communication failover logic, which can operate transparently for a number of different agents that are not aware of such failover logic. In one example, the only requirement for the agents is that the agents are able to receive dynamic RPC connections through multiple interfaces with different IP addresses. This can be the default operation for any responder side logic as long as the hosting OS instance has been configured with the relevant logical network interfaces.

Figure 7:
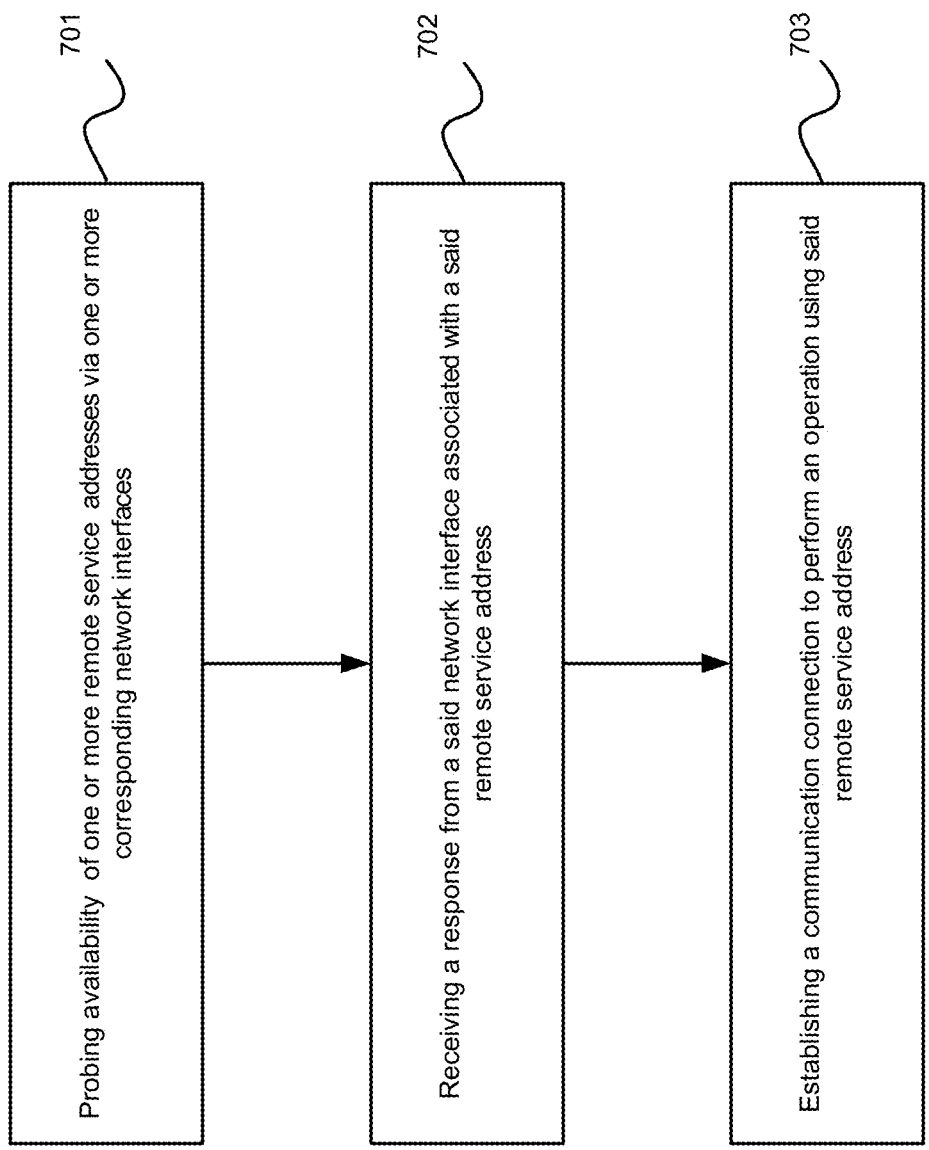
FIG. 7 illustrates an exemplary flow chart for implementing communication fail-over using a ping type probing scheme in a middleware machine environment, in accordance with an embodiment of the invention.

FIG. 7 illustrates an exemplary flow chart for implementing communication fail-over using a ping type probing scheme in a middleware machine environment, in accordance with an embodiment of the invention. As shown in FIG. 7, at step 701, a local server node can probe availability of one or more remote service addresses via one or more corresponding network interfaces. Then, at step 702, the local server node can receive a response from a said network interface associated with a said remote service address. Furthermore, at step 703, the system can establish a communication connection to perform an operation using said remote service address.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for guarding a synchronous transmission control protocol (TCP) based remote procedure call (RPC) operation between an initiator application and a responder application in a middleware machine environment including one or more microprocessors and one or more servers running on the one or more microprocessors, the middleware machine environment interfacing the initiator application executing on a first node having a first network interface associated with a first internet protocol (IP) address with the responder application executing on a target server node having first and second target server network interfaces associated with respective first and second target server node IP addresses, the method comprising:
   determining an availability of a remote service IP address between the first and target server nodes by:
      concurrently probing the first and second target server node IP addresses via the corresponding first and second target server network interfaces of the target server node;
      receiving a first response from a first to respond of said first and second target server network interfaces of the target server node; and
      selecting the one of the first and second target server node IP addresses corresponding to the first to respond of the first and second target server network interfaces as the remote IP address;
   establishing a communication connection path between the first node and the target server node using the selected remote IP address; and
   performing via the communication connection path the synchronous TCP based RPC operation between the initiator and responder applications, wherein the RPC operation comprises receiving by the initiator application a response part of the RPC operation sent from the responder application to the initiator application using the communication connection path, thereby guarding the synchronous TCP based RPC operation.

2. The method according to claim 1, further comprising: associating different internet protocol (IP) addresses with different network interfaces and communication paths.

3. The method according to claim 1, further comprising: implementing communication fail-over as part of a communication layer using application level logics.

4. The method according to claim 1, further comprising ensuring reliability and ordering.

5. The method according to claim 1, further comprising: detecting a need for fail-over based on a TCP timeout.

6. The method according to claim 1, wherein the concurrently probing comprises:
   probing using a datagram based request/response operation.

7. The method according to claim 1, further comprising:
trying an alternative IP address via a corresponding network interface responsive to the concurrently probing failing to receive the first response.

8. The method according to claim 1, wherein the concurrently probing availability comprises concurrently probing for multiple target service addresses and network interfaces.

9. The method according to claim 1, further comprising:
using a ping type operation to guard one or more synchronous TCP based remote procedure call (RPC) operations.

10. The system according to claim 1, further comprising:
closing the communication connection path when the synchronous TCP based RPC operation is completed.

11. A system for guarding a synchronous transmission control protocol (TCP) based remote procedure call (RPC) operation between an initiator application and a responder application in a middleware machine environment including one or more microprocessors and one or more servers running on the one or more microprocessors, the middleware machine environment interfacing the initiator application executing on a first node having a first network interface associated with a first internet protocol (IP) address with the responder application executing on a target server node having first and second target server network interfaces associated with respective first and second target server node IP addresses, the system comprising:
one or more microprocessors,
one or more physical servers running on the one or more microprocessors, wherein the one or more physical servers operate to:
   determine an availability of a remoter service IP address between the first and target server nodes by:
      concurrently probe the first and second target server node IP addresses via the corresponding first and second target server network interfaces of the target server node;
      receive a first response from a first to respond of said first and second target server network interfaces of the target server node; and
      selecting the one of the first and second target server node IP addresses corresponding to the first to respond of the first and second target server network interfaces as the remote IP address;
   establish a communication connection path between the first node and the target server node using the selected remote IP address; and
   perform via the communication connection path the synchronous TCP based RPC operation between the initiator and responder applications, wherein the RPC operation comprises receiving by the initiator application a response part of the RPC operation sent from the responder application to the initiator application using the communication connection path, thereby guarding the synchronous TCP based RPC operation.

12. The system according to claim 11, wherein:
different internet protocol (IP) addresses are associated with different network interfaces and communication paths.

13. The system according to claim 11, wherein the one or more physical servers operate to:
implement a communication fail-over as part of a communication layer using application level logics.

14. The system according to claim 11, wherein the one or more physical servers operate to:
selectively use the TCP for ensuring reliability and ordering.

15. The system according to claim 11, wherein:
the one or more physical servers operate to detect a need for fail-over based on a TCP timeout, and to selectively close the communication connection when the operation is completed.

16. The system according to claim 11, wherein:
the one or more physical servers operate to probe using a datagram based request/response operation.

17. The system according to claim 11, wherein:
the one or more physical servers operate to probe an alternative service address via a corresponding network interface, responsive to the concurrently probing failing to receive the first response.

18. The system according to claim 11, wherein:
the one or more physical servers operate to perform the concurrently probing on multiple target service addresses and network interfaces.

19. The system according to claim 11, wherein:
the one or more physical servers operate to use a ping type operation to guard one or more synchronous TCP based remote procedure call (RPC) operations.

20. A non-transitory machine readable storage medium having instructions stored thereon that when executed on an associated system comprising an initiator application executing in a middle machine environment on a first node having a first network interface associated with a first internet protocol (IP) address and a responder application executing on a target server node having first and second target server network interfaces associated with respective first and second target server node IP addresses, cause the associated system, to perform steps comprising:
determining an availability of a remoter service IP address between the first and target server nodes by:
   concurrently probing the first and second target server node IP addresses via the corresponding first and second target server network interfaces of the target server node;
   receiving a first response from a first to respond of said first and second target server network interfaces of the target server node; and
   selecting the one of the first and second target server node IP addresses corresponding to the first to respond of the first and second target server network interfaces as the remote IP address;
establishing a communication connection path between a first node and the target server node using the selected remote IP address; and
performing via the communication connection path the synchronous TCP based RPC operation between the initiator and responder applications, wherein the RPC operation comprises receiving by the initiator application a response part of the RPC operation sent from the responder application to the initiator application using the communication connection path, thereby guarding the synchronous TCP based RPC operation.

* * * * *

UNITED STATES PATENT AND TRADEMARK OFFICE
CERTIFICATE OF CORRECTION

| | | |
|---|---|---|
| PATENT NO. | : 9,559,894 B2 | Page 1 of 1 |
| APPLICATION NO. | : 13/972678 | |
| DATED | : January 31, 2017 | |
| INVENTOR(S) | : Johnsen et al. | |

It is certified that error appears in the above-identified patent and that said Letters Patent is hereby corrected as shown below:

On the Title Page

Item (72), Column 1, under Inventors, Line 1, delete "Olso" and insert -- Oslo --, therefor.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*